US005970471A

United States Patent [19]
Hill

[11] Patent Number: 5,970,471
[45] Date of Patent: *Oct. 19, 1999

[54] VIRTUAL CATALOG AND PRODUCT PRESENTATION METHOD AND APPARATUS

[75] Inventor: Charles E. Hill, Lynn, Ind.

[73] Assignee: Charles E. Hill & Associates, Inc., Indianapolis, Ind.

[ * ] Notice: This patent is subject to a terminal disclaimer.

[21] Appl. No.: 08/620,947

[22] Filed: Mar. 22, 1996

[51] Int. Cl.⁶ .................................................... G06F 17/60
[52] U.S. Cl. .............................................. 705/26; 705/27
[58] Field of Search ........................ 709/27, 26; 364/403, 364/401

[56] References Cited

U.S. PATENT DOCUMENTS

| | | |
|---|---|---|
| Re. 32,115 | 4/1986 | Lockwood et al. . |
| 3,653,001 | 3/1972 | Ninke . |
| 3,757,037 | 9/1973 | Bialek . |
| 3,899,775 | 8/1975 | Larsen . |
| 4,091,448 | 5/1978 | Clausing . |
| 4,149,246 | 4/1979 | Goldman . |
| 4,186,438 | 1/1980 | Benson et al. . |
| 4,200,930 | 4/1980 | Rawlings et al. . |
| 4,204,251 | 5/1980 | Brudevold . |
| 4,289,930 | 9/1981 | Connolly et al. . |
| 4,319,336 | 3/1982 | Anderson et al. . |
| 4,359,631 | 11/1982 | Lockwood et al. . |
| 4,412,285 | 10/1983 | Neches et al. . |
| 4,414,621 | 11/1983 | Bown et al. . |
| 4,432,057 | 2/1984 | Daniell et al. . |
| 4,460,960 | 7/1984 | Anderson et al. . |
| 4,514,815 | 4/1985 | Anderson . |
| 4,528,643 | 7/1985 | Freeny, Jr. . |
| 4,530,009 | 7/1985 | Mizokawa . |
| 4,549,275 | 10/1985 | Sukonick . |
| 4,553,222 | 11/1985 | Kurland et al. . |
| 4,558,413 | 12/1985 | Schmidt et al. . |
| 4,575,679 | 3/1986 | Chung et al. .................... Holly . |

(List continued on next page.)

FOREIGN PATENT DOCUMENTS

| | | |
|---|---|---|
| 0 217 351 | 4/1987 | European Pat. Off. . |
| 0 290 828 | 11/1988 | European Pat. Off. . |
| 0284924 | 11/1988 | European Pat. Off. . |
| 0 396 834 | 5/1989 | European Pat. Off. . |
| 0 323 707 | 7/1989 | European Pat. Off. . |
| 2 105 075 | 3/1983 | United Kingdom . |

OTHER PUBLICATIONS

IBM, IBM Publishing Systems BbookMaster, User's Guide, Release 2.0, Third Edition, Jan. 1989, pp. 315–328.
Satyanarayanan, Scalable, Secure, and Highly Available Distributed File Access, IEEE Computer, May 1990, pp. 9–20.
Stix, The Shop–At–Home Gamble, Computer Decisions, Oct. 7, 1986, pp. 28–36.
IBM PC/Colorview for the IBM Personal Computer, advertising brochure, 4 pages, Apr. 12, 1986.
Conklin, Hypertext: An Introduction and Survey, IEEE Computer, Sep. 1987, pp. 17–41.

(List continued on next page.)

Primary Examiner—Kevin J. Teska
Assistant Examiner—Lonnie A. Knox
Attorney, Agent, or Firm—Barnes & Thornburg

[57] ABSTRACT

An apparatus and method are provided for presenting a plurality of product images for review by a user on a computer including a display, a memory, and an input device. The method includes the steps of displaying a plurality of product images on the display, providing product image review boxes on the display for a side-by-side comparison of selected product images, receiving a user input selecting a product image from the plurality of product images displayed on the display, and displaying the selected product image in one of the review boxes for a side-by-side comparison with at least one other selected product image. The product images include both a product image and a selected background image. The step of displaying the selected product image includes the step of integrating the product image with a selected background image to provide a customized product image on the display.

39 Claims, 14 Drawing Sheets

U.S. PATENT DOCUMENTS

| | | |
|---|---|---|
| 4,597,058 | 6/1986 | Izumi et al. . |
| 4,630,234 | 12/1986 | |
| 4,641,274 | 2/1987 | Swank . |
| 4,645,873 | 2/1987 | Chomet . |
| 4,658,093 | 4/1987 | Hellman . |
| 4,661,811 | 4/1987 | Gray et al. . |
| 4,691,340 | 9/1987 | Maeda et al. . |
| 4,700,181 | 10/1987 | Maine et al. . |
| 4,714,992 | 12/1987 | Gladney et al. . |
| 4,714,995 | 12/1987 | Materna et al. . |
| 4,714,996 | 12/1987 | Gladney et al. . |
| 4,724,521 | 2/1988 | Carron et al. . |
| 4,734,764 | 3/1988 | Pocock et al. . |
| 4,748,561 | 5/1988 | Brown . |
| 4,751,635 | 6/1988 | Kret . |
| 4,751,669 | 6/1988 | Sturgis et al. . |
| 4,754,326 | 6/1988 | Kram et al. . |
| 4,760,458 | 7/1988 | Watanabe et al. . |
| 4,768,144 | 8/1988 | Winter et al. . |
| 4,774,664 | 9/1988 | Campbell et al. . |
| 4,782,325 | 11/1988 | Jeppsson et al. . |
| 4,787,050 | 11/1988 | Suzuki . |
| 4,792,849 | 12/1988 | McCalley et al. . |
| 4,794,519 | 12/1988 | Koizumi et al. . |
| 4,799,156 | 1/1989 | Shavit et al. . |
| 4,800,488 | 1/1989 | Agrawal et al. . |
| 4,805,119 | 2/1989 | Maeda et al. . |
| 4,805,134 | 2/1989 | Calo et al. . |
| 4,819,159 | 4/1989 | Shipley et al. . |
| 4,825,354 | 4/1989 | Agrawal et al. . |
| 4,827,330 | 5/1989 | Walsh et al. . |
| 4,827,399 | 5/1989 | Shibayama . |
| 4,833,625 | 5/1989 | Fisher et al. . |
| 4,845,634 | 7/1989 | Vitek et al. . |
| 4,845,665 | 7/1989 | Heath et al. . |
| 4,849,679 | 7/1989 | Chinnaswamy et al. . |
| 4,851,994 | 7/1989 | Toda et al. . |
| 4,853,843 | 8/1989 | Ecklund . |
| 4,858,114 | 8/1989 | Heath et al. . |
| 4,860,123 | 8/1989 | McCalley et al. . |
| 4,866,611 | 9/1989 | Cree et al. . |
| 4,868,866 | 9/1989 | Williams, Jr. . |
| 4,882,705 | 11/1989 | Yasue . |
| 4,887,204 | 12/1989 | Johnson et al. . |
| 4,891,503 | 1/1990 | Jewell . |
| 4,893,307 | 1/1990 | McKay et al. . |
| 4,897,781 | 1/1990 | Chang et al. . |
| 4,897,782 | 1/1990 | Bennett et al. . |
| 4,901,223 | 2/1990 | Rhyne . |
| 4,905,094 | 2/1990 | Pocock et al. . |
| 4,914,587 | 4/1990 | Clouse . |
| 4,916,441 | 4/1990 | Gombrich . |
| 4,918,588 | 4/1990 | Barrett et al. . |
| 4,928,233 | 5/1990 | Millis . |
| 4,931,929 | 6/1990 | Sherman . |
| 4,937,760 | 6/1990 | Beitel et al. . |
| 4,941,040 | 7/1990 | Pocock et al. . |
| 4,943,707 | 7/1990 | Boggan . |
| 4,949,248 | 8/1990 | Caro . |
| 4,949,300 | 8/1990 | Christenson et al. . |
| 4,954,697 | 9/1990 | Kokubun et al. . |
| 4,973,952 | 11/1990 | Malec et al. . |
| 4,974,149 | 11/1990 | Valenti . |
| 4,975,840 | 12/1990 | De Tore et al. . |
| 4,980,826 | 12/1990 | Wagner . |
| 4,984,155 | 1/1991 | Geier et al. . |
| 4,992,940 | 2/1991 | Dworkin . |
| 5,008,853 | 4/1991 | Bly et al. . |
| 5,014,125 | 5/1991 | Pocock et al. . |
| 5,019,963 | 5/1991 | Alderson et al. . |
| 5,023,907 | 6/1991 | Johnson et al. . |
| 5,043,919 | 8/1991 | Callaway et al. . |
| 5,101,444 | 3/1992 | Wilson et al. . |
| 5,103,476 | 4/1992 | Waite et al. . |
| 5,117,354 | 5/1992 | Long et al. . |
| 5,138,712 | 8/1992 | Corbin . |
| 5,151,989 | 9/1992 | Johnson et al. . |
| 5,155,847 | 10/1992 | Kirouac et al. . |
| 5,179,660 | 1/1993 | Devany et al. . |
| 5,182,170 | 1/1993 | Marcus et al. . |
| 5,182,770 | 1/1993 | Medveczky et al. . |
| 5,231,566 | 7/1993 | Blutinger et al. ........................ 364/401 |
| 5,276,883 | 1/1994 | Halliwell . |
| 5,283,861 | 2/1994 | Dangler et al. . |
| 5,319,542 | 6/1994 | King, Jr. et al. . |
| 5,347,632 | 9/1994 | Filepp et al. . |
| 5,361,393 | 11/1994 | Rossillo . |
| 5,383,111 | 1/1995 | Homma et al. ......................... 364/401 |
| 5,423,033 | 6/1995 | Yuen . |
| 5,442,771 | 8/1995 | Filepp et al. . |
| 5,451,998 | 9/1995 | Hamrick ................................... 348/13 |
| 5,473,772 | 12/1995 | Halliwell et al. . |
| 5,493,490 | 2/1996 | Johnson ................................. 364/401 |
| 5,528,490 | 6/1996 | Hill ........................................ 364/403 |
| 5,535,407 | 7/1996 | Yanagawa et al. . |
| 5,576,951 | 11/1996 | Lockwood ............................. 395/227 |
| 5,577,244 | 11/1996 | Killebrew et al. . |
| 5,592,378 | 1/1997 | Cameron et al. ...................... 395/227 |
| 5,594,910 | 1/1997 | Filepp et al. . |
| 5,664,110 | 9/1997 | Green et al. .............................. 705/26 |
| 5,664,111 | 9/1997 | Nahan et al. ............................. 705/27 |
| 5,794,217 | 8/1998 | Allen ........................................ 705/27 |
| 5,839,117 | 11/1998 | Cameron et al. ......................... 705/27 |
| 5,850,446 | 12/1998 | Berger et al. ............................. 380/24 |

OTHER PUBLICATIONS

Markoff, Betting on a Different Videotex Idea, The New York Times, July 12, 1989.

Prestel Terminal Specification, Edition One, Prestel Liaison Group Technical Sub–Committee –PLG (Tech) Sub–Committee, Jan. 1981.

Lindsay, Object Naming and Catalog Management for a Distributed Database Manager, Computer Science Research Report, IBM, Research Division, Aug. 29, 1980.

Daniels et al., An Introduction to Distributed Query Compilation in R*, Computer Science Research Report, IBM, Research Division, Jun. 4, 1962.

Selinger et al., Site Autonomy Issues in R*: A Distributed Database Management System, Information Sciences 29, 1983, pp. 249–257.

Lindsay et al., R*: A Distributed Database Manager, ACM Transactions on Computer Systems, vol. 2, No. 1, Feb. 1984, pp. 25–38.

Lindsay, A Retrospective of R*; A Distributed Database Management System, Proceedings of the IEEE, vol. 75, No. 5, May 1987.

Gray et al., The Recovery Manager of the System R Database Manager, Computing Surveys, vol. 13, No. 2, Jun. 1981, pp. 223–242.

Mohan et al., Efficient Commit Protocols for the Tree of Processes Model of Distributed Transactions, Proceedings of the Second ACM Symposium on Principles of Distributed Computing, 1983.

Williams et al., R*: An Overview of the Architecture, IBM Research, San Jose, California, Copyright 1982.

Lindsay, Single and Multi–Site Recovery Facilities, Distributed Databases, Chapter 10, 1980.

Blasgen et al., System R; An Architectural Update, Computer Science Report RJ2581, IBM Research Division, Jun. 1979.

Antonoff, The Prodigy Promise, Personal Computing, May 1989, pp. 67–73.

Rothfeder, How Long Will Prodigy Be A Problem Child, Business Week, Sep. 10, 1990, p. 75.

Warner, Adventures in the On–Line Universe, Business Week, Jun. 17, 1991, pp. 112–113.

"The Handbook, Find Out How to Get the Most Out of Prodigy", Prodigy Services Company, Copyright 1990, 1991.

"The Handbook For Your Software Upgrade", Prodigy Services Company, Copyright 1990.

Terry, D.B., "Caching Hints in Distributed Systems, IEEE Transactions on Software Engineering", vol. SE–13, No. 1, Jan. 1987.

Chorafas, D.N., "Databases for Networks and Minicomputers", Copyright 1982 Petrocelli Books, Inc., ISBN 0–89433–136–1, pp. 83–86.

Lorin, H., "Aspects of Distributed Computer Systems", Copyright 1980 by John Wiley & Sons, Inc., ISBN 0–471–08114–0.

Garcia–Molina, Hector, "Reliability Issues for Completely Replicated Distributed Databases", Tutorial Distributed Processing, Third Ed., LOC 80–85249, IEEE Computer Society Press, 1981, pp. 529–536.

Wong, "Dynamic Re–Materialization: Processing Distributed Queries Using Redundant Data", Fifth Berkeley Workshop on Distributed Data Mgmt. and Computer Networks, LBL–11860UC–32 CONF–810202, Feb. 3–5, 1981, pp. 3–13.

Strom, "Consistency of Redundant Databases in a Weakly Coupled Distributed Computer Conferencing System", Fifth Berkeley Workshop on Distributed Data Mgmt. and Computer Networks, LBL–11860UC–32 CONF–810202, Feb. 3–5, 1981, pp. 143–153.

Parker, et al., "Detection of Mutual Inconsistency in Distributed Systems", Fifth Berkeley Workshop on Distributed Data Management and Computer Networks, LBL–11860UC–32 CONF–810202, Feb. 3–5, 1981, pp. 172–183.

Apers, "Redundant Allocation of Relations in a Communications Network", Fifth Berkeley Workshop on Distributed Data Management and ComputerNetworks, LBL–11860UC–32 CONF–810202, Feb. 3–5, 1981, pp. 245–247.

Gecsci, "The Architecture of Videotex Systems", Chapter 6—"Topology of Videotex Networks", Prentice–Hall, 1983.

Tanenbaum, Andrew S., "Computer Networks", Chapter 10–"The Application Layer", Prentice–Hall, 1981, pp. 440–444.

Bernstein, et al., "The Concurrency Control Mechanism of SDD–1: A System for Distributed Databases", IEEE Transactions on Software Engineering, vol. SE–4, No. 3, May 1978, pp. 154–168.

Parker, et al., "Detection of Mutual Inconsistency in Distributed Systems", IEEE Transactions on Software Engineering, vol. SE–9, No. 3, May 1983, pp. 240–247.

Ceri, et al., "Distribution Design of Logical Database Schemas", IEEE Transactions on Software Engineering, vol. SE–9, No. 4, Jul. 1983, pp. 487–504.

Gray, "AnApproach to Decentralized Computer Systems", IEEE Transactions on Software Engineering, vol. SE–12, No. 6, Jun. 1986, pp. 684–692.

Weihl, "Distributed Version Management for Read–Only Actions", IEEE Transactions on Software Engineering, vol. SE–13, No. 1, Jan. 1987, pp. 55–64.

Terry, "Caching Hints in Distributed Systems", IEEE Transactions on Software Engineering, vol. SE–13, No. 1, Jan. 1987, pp. 48–54.

Sarin, "Discarding Obsolete Information in a Replicated Database System", IEEE Tranactions on Software Engineering, vol. SE–13, No. 1, Jan. 1987, pp. 39–47.

Fuchs, et al., "Comparison and Diagnosis of Large Replicated Files", IEEE Transactions on Software Engineering, vol. SE–13, No. 1, Jan. 1987, pp. 15–22.

Weitzman, "Distributed Micro/Minicomputer Systems, Centralized versus Distributed Data Bases and/or Processing", Prentice Hall, Inc., 1980, ISBN 0–13–2146481–7, pp. 5–6.

Viescas, "The Official Guide to the Prodigy Service", Microsoft Press, ISBN 1–55615–374–0, 1991.

Date, "An Introduction to Databse Systems", vol. II, Addison–Wesley System Programming Series, ISBN 0–201–14474–3, Jul., 1984.

Nielsen, "Finding it on the Internet: The Next Challenge for Librarianship", Database, vol. 13, Oct. 1990.

Berners–Lee, "Information Management: A Proposal", pp. 7040–7054, Mar. 1989, May 1990.

Berners–Lee, "The ENQUIRE System Short Description", European Organisation for Nuclear Research, pp. 7085–7099, Oct. 1980.

Information Sciences Institute, "Tranmission Control Protocol", DARPA Internet Program, Protocol Specification, pp. 1–77, Sept. 1981.

Jones, "MAP/TOP Networking", McGraw–Hill Book Company, pp. 22–43, 1988.

Trevor, "Personal Color Radar for the IBM Personal Computer", User's Manual, pp. 1–18, Sep. 7, 1983.

"Videolog$^{SM}$ : The new instant access electronic medium", VideoLog Communications, pp. 1–4, 1984.

Viescas, "Prodigy Made Easy", Prodigy Services Company, 1991.

Gelenbe et al., "Analysis of Update Synchronization for Multiple Copy Data–Bases", Proceedings of the Third Berkeley Workshop on Distributed Data Management and Computer Networks, pp. 5277–5299, Aug. 29–31, 1978.

Hendricks, "A Filesystem For Software Development", Sun Microsystems, Inc., USENIX Summer Conference, June 11–15, 1990, Anaheim, California, pp. 333–340.

Walker, et al., "The LOCUS Distributed Operating System", acm Operating Systems Review, vol. 17, No. 5, Proceedings of the Ninth ACM Symposium on Operating Systems Principles, Oct. 10–13, 1983.

Sheltzer, et al., "Internet Locus: Extending Transparency to an Internet Environment", IEEE Transactions on Software Engineering, vol. SE–12, No. 11, Nov. 1986.

Ellis, "a Robust Algorithm for Updating Duplicate Databases", Proceedings of the Second Annual Berkeley Workshop on Distributed Data Management and Computer Networks, pp. 146–158, May 1977.

Hac' et al., "Algorithms for File Replication in a Distributed System", J. Systems Software, pp. 173–181, 1991.

Carson, et al., "MicroLIAS: Beyond the Online Public Access Catalog", Library Hi Tech, Consecutive Issue 15, vol. 4, No. 3, Fall 1986.

Heinemann, "Auto–graphics' AGILE II", Library Hi Tech, Consecutive Issue 13; vol. 4, No. 1, Spring 1986.

The Newsletter for Members of the PRODIGY[SM] Interactive Personal Service, Prodigy Services Company, vol. 1, No. 9, Oct. 17, 1988.

The Newsletter for Members of the PRODIGY[SM] Interactive Personal Service, Prodigy Services Company, vol. 1, No. 11, Nov. 21, 1988.

The Newsletter for Members of the PRODIGY[SM] Interactive Personal Service, Prodigy Services Company, vol. 1, No. 12, Dec. 1988.

The Newsletter for Members of the PRODIGY[SM] Interactive Personal Service, Prodigy Services Company, vol. 11, No. 2, Mar. 1989.

Gecsei, "The Architecture of Videotex Systems", Prentice-Hall, Inc., Englewood Cliffs, New Jersey, 1983.

Garcia–Molina, "The Future of Data Replication", Fifth Symposium on Reliability in Distributed Software and Database Systems, IEEE Computer Society Order No. 690, IEEE Catalog Number 86CH2260–8, pp. 13–19, Jan. 13–15, 1986.

Banton, "An On–line Retail Collection Data System", Software–Practice and Experience, vol. 1, No. 3, pp. 235–243, 1971.

Van Dam et al., "Intelligent Satellites for Interactive Graphics", Proceedings of the IEEE, vol. 62, No. 4, Apr. 1974.

Cerf et al., "A Protocol for Packet Network Intercommunication", IEEE Transactions on Communications, vol. Com–22, No. 5, May 1974.

Slonim et al., "Considerations for Determining the Degrees of Centralization or Decentralization in the Computing Environment", Information & Management, pp. 15–29, 1979.

Muro et al., "Evaluation of the File Redundancy in Distributed Database Systems", IEEE Transactions on Software Engineering, vol. SE–11, No. 2, FEB. 1985.

Adiba et al., "Database Snapshots", Sixth International Conference on Very Large Data Bases, Montreal, Canada, Oct. 1–3, 1980.

Nelson, "Using Prodigy", Que Corporation, 1990.

"Introducing the PRODIGY Service", Prodigy Services Company brochure, 1990–1991.

"CompuServe Navigator[SM]", User's Guide, CompuServe Incorporated, 1989.

"Prodigy Directory of JUMPword Listings", vol. 1, No. 2, Prodigy Interactive Personal Service, Winter, 1989.

"Prodigy Interactive Personal Service Made Easy", Osborne McGraw–Hill, 1991.

| Order Pad | | | |
|---|---|---|---|
| Qty. | Style Number | Description | Metal Color |
| 1 | 35-779-1CT | | 14K Y |
| 1 | 35-487W | | 14K Y |
| 1 | 35-487MS | | 14K Y |

[ Exit ]  [ Order ]  [ Inquire ]  [ ? Help ]

FIG. 14

VIRTUAL CATALOG AND PRODUCT PRESENTATION METHOD AND APPARATUS

BACKGROUND AND SUMMARY OF THE INVENTION

The present invention relates to an electronic catalog apparatus and method. More particularly, the present invention relates to a virtual product catalog and product inventory control and presentation apparatus and method.

The present invention provides a virtual product catalog and product presentation apparatus to assist with merchandising of products. One problem is common to the merchandising of all products. This problem is the inability to determine which categories of a product line will sell well at a particular store location. The result is that a product that sells well at one location may have a poor sales record at another location, such as in another city or on an other side of town. Since inventory turnover is the key to profits in retailing, this inability to forecast customer requirements accurately reduces profits for retailers.

Two common methods have been applied to attempt to reduce this problem. One method is to build "superstores" in order to assure product availability by offering a very large selection. The superstore provides a larger base of products in order to give the illusion of providing one-stop shopping to customers. Superstores, however, do not optimize inventory. A second method is to tailor product availability to regular customers of a specific store and to move product in and out of stock rapidly at each location based on customer demands. Both methods have had some success. This second method, typically called vertical or niche merchandising, does a better job of managing inventory while supplying regular customers with the products they require. The second method, however, has the disadvantage of making each store layout unique and having product availability which is inconsistent between stores.

The present invention is designed to provide a solution to the product merchandising problem. Throughout this specification, the present invention will be described in connection with jewelry industry products. It is understood, however, that the apparatus and method of the present invention may be used with any type of products. Therefore, the examples of jewelry industry products are for illustrative purposes only and are not intended to limit the scope of the present invention.

In the jewelry industry, purchasing decisions of customers are based largely upon visual appreciation of style and color. When a prospective customer enters a jewelry store, he or she approaches the showcase containing those pieces of specific interest, such as engagement rings, earrings, pendants, bracelets, necklaces, etc. The jeweler then brings a tray of items to the counter where one or more pieces of interest to the perspective customer are placed to the side for further study. The jeweler continues this process until a few pieces of particular interest have been gathered. At this point, the prospective customer's attention is focused on these few pieces and the jeweler can now bring closure to the sale. If the prospective customer does not find any of the in-stock items to be of interest, the jeweler can only suggest that the customer look at a competitors' in-stock products offering or look through several catalogs for something that more closely meets with the customers requirements.

Apparatus and method of the present invention, the shortcomings of the standard merchandising are overcome by providing an electronic image of the various products available to the customer using a computer at the store location. Unlike the limitations of physical space and financing imposed on in-stock inventory, a video catalog can offer a substantially greater number of product selections. In addition, the apparatus of the present invention provides an efficient and secure method of demonstrating products to the customer.

Using the apparatus of the present invention, the customer is led to a particular product category via a hierarchical menu structure. Once the product category is selected, the customer browses through various available items. The customer then selects products of interest by using a menu icon and a computer mouse input device or by touching the icon on the screen if the system utilizes a touch screen monitor. An image of each selected product item and its associated data are then placed in a separate review box on the computer screen for further review. As additional items of interest are found, these items may also be placed in remaining boxes. The number of review boxes for reviewing products is typically based on monitor and graphics resolution capabilities. Illustratively, four such review boxes are used for reviewing selected products. It is understood that more or less image boxes can be used depending upon the application and the available display technology.

One feature of this invention is the ability to select individual product items as they are displayed in image boxes and to move the selected product items to a separate review screen. This permits the customer to browse through multiple categories of items and move selected product items to a separate review screen for later inspection and side-by-side comparison to other selected product items. Once a few selected items of interest are moved to the review screen, again arbitrarily limited to four items, these items can be compared side-by-side for a quick decision of which item the customer would like to purchase. If the selected item for purchase is not in stock, the apparatus of the present invention generates an order form for electronic or manual delivery to the product vendor.

The present invention enables the jeweler to minimize actual in-stock inventory to only those items required to provide the prospective customer the look and feel of the quality of similar merchandise. At the same time, the jeweler can offer a very large selection of products and can demonstrate these products to customers quickly and efficiently. The present invention therefore improves the efficiency of product presentation, improves sales productivity, and provides means for implementing just-in-time inventory for the retail merchandiser.

The present invention also provides the operator with the ability to overlay an image of a product on a desired background. In merchandising, special days are used to help generate interest in a particular product. When advertising products for these special days or seasons, a merchandiser typically generates a flyer having pictures of the merchandise on a background illustrating or representing the particular holiday.

The present invention provides the operator the capability of dynamically applying a desired background to a product image. For instance, a Christmas scene may be dynamically applied as the background to a piece of jewelry that the retailer wishes to offer as a Christmas special. A different background can be applied for every day of the year to selected pieces of merchandise. This allows the merchandiser to have a virtual catalog where both the product selection and the product presentation can change on demand.

Techniques disclosed in U.S. patent application Ser. No. 07/866,867 may be used to integrate and maintain static or constant data and variable data. The present invention uses a "map" to define the exact way a product image, product information, and background image are integrated together to provide a visual product presentation on the computer located at the store location. In addition, all components of the presentation image can be managed and maintained by a central server located at the vendor's corporate location. This allows corporate marketing and advertising departments to control and manage product presentation efficiently at each sales location.

According to one aspect of the present invention, a method is provided for presenting a plurality of product images for review by a user on a computer including a display, a memory, and an input device. The method includes the steps of displaying a plurality of product images on the display, providing product image review boxes on the display for a side-by-side comparison of selected product images, receiving a user input selecting a product image from the plurality of product images displayed on the display, and displaying the selected product image in one of the review boxes for a side-by-side comparison with at least one other selected product image.

In the illustrative method, the step of displaying a plurality of product images includes the step of displaying a scroll box on the display which includes the plurality of product images from the selected product category. The product images in the review boxes are typically larger than the product images in the scroll box. The selected product images are displayed in the next available review box until all the review boxes are filled with product images. The next selected product image replaces the product image in one of the review boxes. The user may select the review box in which to replace the product image after all the review boxes are filled with product images.

The illustrated method also includes the steps of receiving a user input to order a selected product displayed on the display, and automatically generating an order form for the selected product. The method further includes the step of automatically transmitting the order form for the selected product from the computer to a vendor's computer located at a remote location.

According to another aspect of the invention, a method is provided for presenting a plurality of product images for review by a user on a computer including a display, a memory, and an input device. The method includes the steps of displaying a menu including a plurality of available vendors on the display, receiving a user input selecting one of the vendors, displaying a product category menu on the display for products available from a selected vendor, receiving a user input selecting one of the product categories from the product category menu, and displaying a plurality of product images on the display from the selected product category. The method also includes the steps of providing at least two product image review boxes on the display for a side-by-side comparison of selected product images, receiving a user input selecting a product image from the plurality of product images displayed on the display, and displaying the selected product image in one of the display boxes for a side-by-side comparison with at least one other selected product image.

The product category menu is typically a hierarchical product category menu including at least two levels. In the illustrated method, the hierarchical product category menu includes three levels.

The illustrated method further includes the step of establishing a communication link between the computer and a vendor's computer located at a remote location after the desired product category is selected. The vendor's computer transmits variable data and updated constant data related to the plurality of products from the selected product category to the computer.

According to yet another aspect of the present invention, a method is provided for displaying a product image for review by a user on a computer including a display, a memory, and an input device. The method includes the steps of storing a plurality of product images in the memory of the computer, storing a plurality of background images in the memory of the computer, and selecting one of the background images to be displayed on the display with each product image. The method also includes the steps of receiving a user input to display a selected product image, and integrating the selected product image with the selected background image on the display to provide a customized product image on the display.

In one embodiment of the illustrated method, the product image and the selected background image are integrated based on a map transmitted to the computer from a vendor's computer located at a remote location. The step of storing a plurality of product images in the memory of the computer illustratively includes the steps of photographing the products against a black background, converting the photographic product image into a digital product image data format, changing any black pixels in the digital product image data to cyan pixels, and storing the modified product image data in the computer memory. The integrating step includes the step of overlaying the modified product image data over a selected background image on the display so that the cyan pixels in the modified product image data permit the background image to be displayed on the display.

According to a further aspect of the present invention, an apparatus is provided for presenting a plurality of product images for review by a user. The apparatus includes a computer including a display, a memory, and an input device. The apparatus also includes means for displaying a plurality of product images on the display, means for providing product image review boxes on the display for a side-by-side comparison of selected product images, means for receiving a user input selecting a product image from the plurality of product images displayed on the display, and means for displaying the selected product image in one of the review boxes for a side-by-side comparison with at least one other selected product image.

In the illustrated apparatus, the means for displaying a plurality of product images includes means for displaying a scroll box on the display which includes the plurality of product images from the selected product category. The product images in the review boxes are typically larger than the product images in the scroll box. The selected product images are displayed in the next available review box until all the review boxes are filled with product images. The next selected product image replaces the product image in one of the review boxes. In one embodiment, the user selects the review box in which to replace the product image after all the review boxes are filled with product images.

The illustrative apparatus further includes means for receiving a user input to order a selected product displayed on the display, and means for generating an order form for the selected product. The apparatus also includes means for transmitting the order form for the selected product from the computer to a vendor's computer located at a remote location.

According to a still further aspect of the present invention, an apparatus is provided for presenting a plurality of product images for review by a user. The apparatus includes a computer including a display, a memory, and an input device. The apparatus also includes means for displaying a menu including a plurality of available vendors on the display, means for receiving a user input selecting one of the vendors, means for displaying a product category menu on the display for products available from a selected vendor, means for receiving a user input selecting one of the product categories from the product category menu, and means for displaying a plurality of product images on the display from the selected product category. The apparatus further includes means for providing at least two product image review boxes on the display for a side-by-side comparison of selected product images, means for receiving a user input selecting a product image from the plurality of product images displayed on the display, and means for displaying the selected product image in one of the display boxes for a side-by-side comparison with at least one other selected product image.

One embodiment of the apparatus includes means for establishing a communication link between the computer and a vendor's computer located at a remote location after the desired product category is selected. The vendor's computer transmits variable data and updated constant data related to the plurality of products from the selected product category to the computer.

According to an additional aspect of the present invention, an apparatus is provided for displaying a product image for review by a user. The apparatus includes a computer including a display, a memory, and an input device. The apparatus also includes means for storing a plurality of product images in the memory of the computer, means for storing a plurality of background images in the memory of the computer, means for selecting one of the background images to be displayed on the display with each product image, means for receiving a user input to display a selected product image, and means for integrating the selected product image with the selected background image on the display to provide a customized product image on the display.

In the illustrated apparatus, the product image and the selected background image are integrated by the integrating means based on a map transmitted to the computer from a vendor's computer located at a remote location. The integrating means includes means for overlaying the product image over a selected background image on the display.

Additional objects, features, and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The detailed description particularly refers to the accompanying figures in which:

FIG. 14 is an order pad screen displayed on the computer for ordering products.

DETAILED DESCRIPTION OF DRAWINGS

Figure 1:
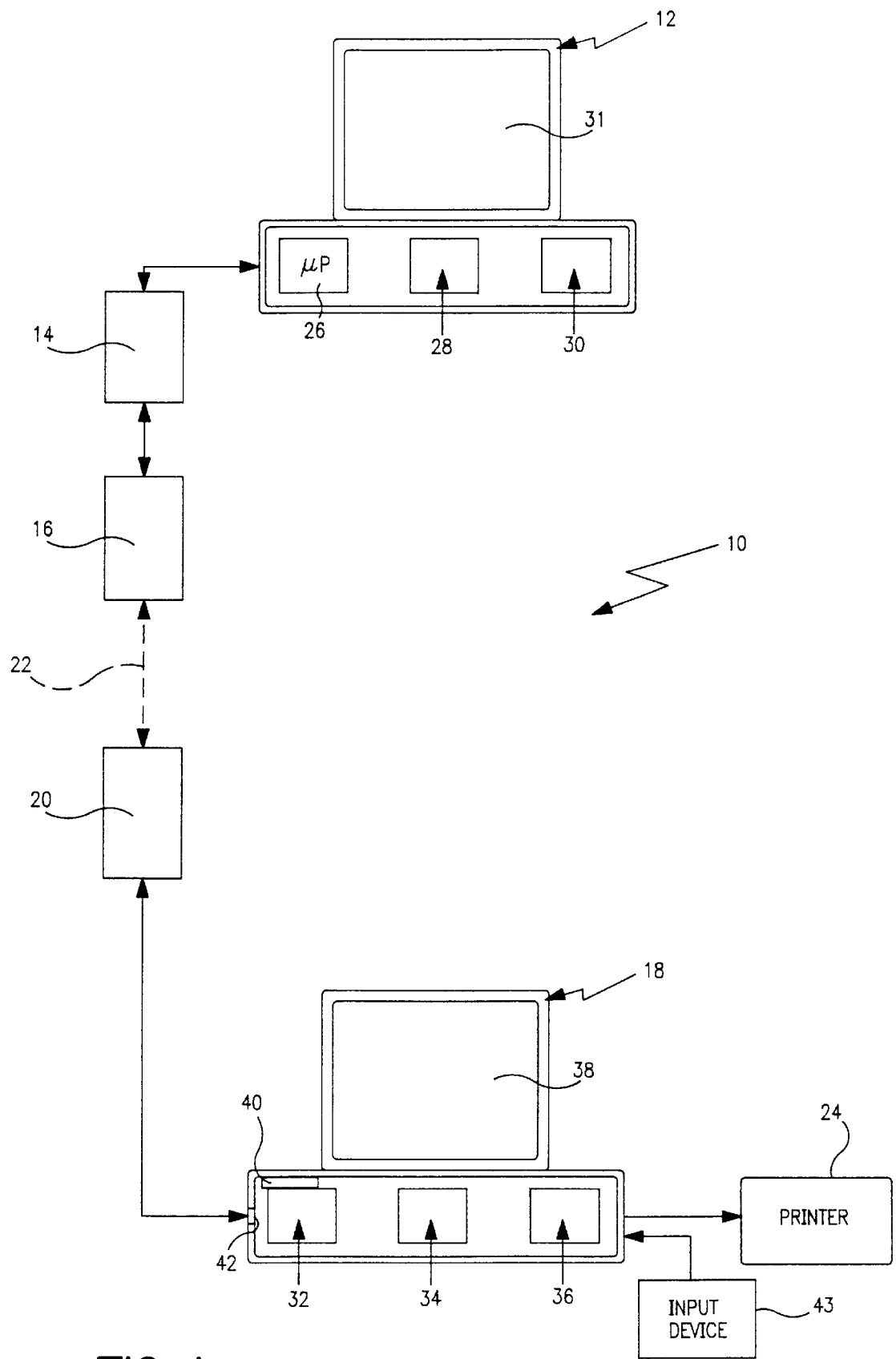
FIG. 1 is a diagrammatical view illustrating a connection between a computer at a sales location and to a vendor's computer in one embodiment of the electronic virtual catalog apparatus of the present invention.

Referring now to the drawings, FIG. 1 illustrates a block diagram of an electronic catalog system 10 of the present invention. Operation of the electronic catalog system 10 is described in detail in U.S. application Ser. No. 07/866,867 filed Apr. 10, 1992, which is expressly incorporated herein by reference. Catalog system 10 includes a vendor's computer or server 12 located at a vendor's place of business. The vendor's computer is coupled to a multi-port intelligent communications array 14 which is coupled to a modem 16. The catalog system 10 also includes a computer 18 located at a remote sales location. Computer 18 is also coupled to a modem 20 which communicates with modem 16 at the vendor's location via telephone communication lines 22.

Vendor's computer 12 includes a microprocessor 26, an internal RAM 28, a hard disk drive 30, and a graphics monitor 31. Computer 18 includes a microprocessor 32, an internal RAM 34, a hard disk drive 36, and a graphics monitor 38. Computer 18 is also coupled to a printer 24. The computer 18 further includes a floppy disk drive 40 and a serial communications port 42. Computer 18 also includes a user input device 43 such as a keyboard or mouse. A touch screen may also be used as an input device, if desired.

The computer 18 at the sales location is programmed with the software to provide a virtual catalog and product presentation apparatus for improved merchandising of the products to customers. While the illustrated embodiment of the present invention shows the computer 18 communicating with a vendor's server computer 12 at a remote location via modems 20 and 16, respectively, it is understood that other communication techniques can be used. For instance, communication between computer 18 and vendor's computer 12 may be accomplished through the Internet. In addition, for some applications, data can be supplied to the sales location computer 18 by the vendor by periodically sending updated data disks which are loaded into the memory of computer 18.

Figure 2:
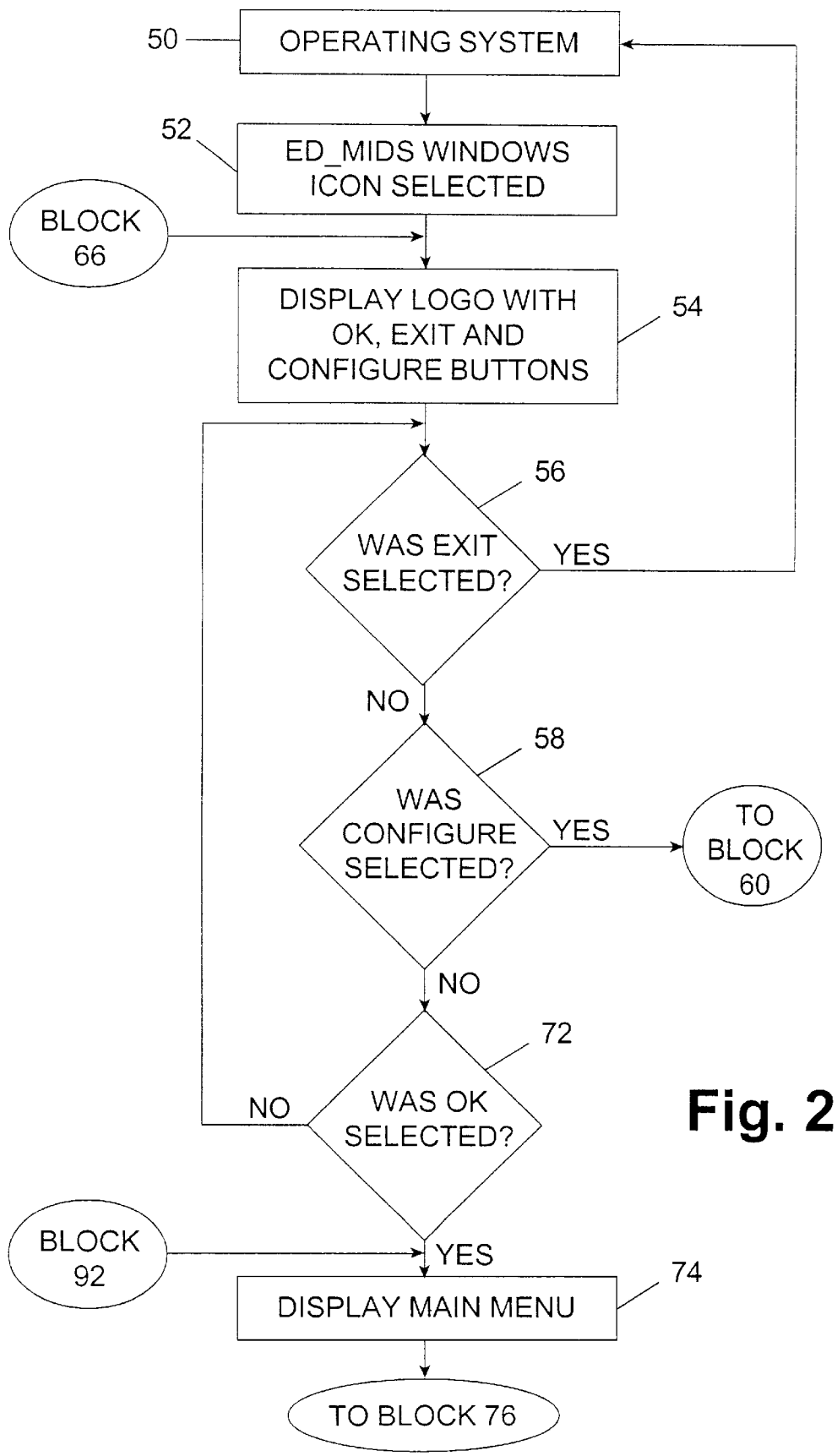
FIG. 2 is a flow chart illustrating the steps performed by the apparatus of the present invention after the software is accessed by the computer at the sales location.

In operation, the software program of the present invention is accessed from an operating system of computer 18 illustrated at block 50 of FIG. 2. Illustratively, the software package of the present invention is accessible from a windows operating system. Once the windows icon for the program of the present invention is selected at the block 52, computer 18 displays a logo of the ED-MIDS® Visual Order Entry$^{SM}$ software system along with option buttons labeled "OK," "Exit" and "Configure" as illustrated at block 54. An operator can then select the appropriate button using a standard mouse input computer device.

Computer 18 determines whether the Exit button was selected at block 56. If the Exit button was selected, the computer 18 returns to the operating system at block 50. If the Exit button was not selected at block 56, computer 18 proceeds to determine whether the configuration button was selected at block 58. If the Configure button was selected, computer 18 proceeds to block 60 of FIG. 3.

These screen fields include server connection with options for either a modem connection via some type of telephone service or a network connection via a local or wide area network. A network setting allows a user to select the drive letter designating the network connection. Modem settings include a choice of Tone or Pulse, Baud Rate, Comm Port, the telephone number, and a modem initialization string. To exit, the setup screen offers either an O.K. or Cancel option.

Figure 3:
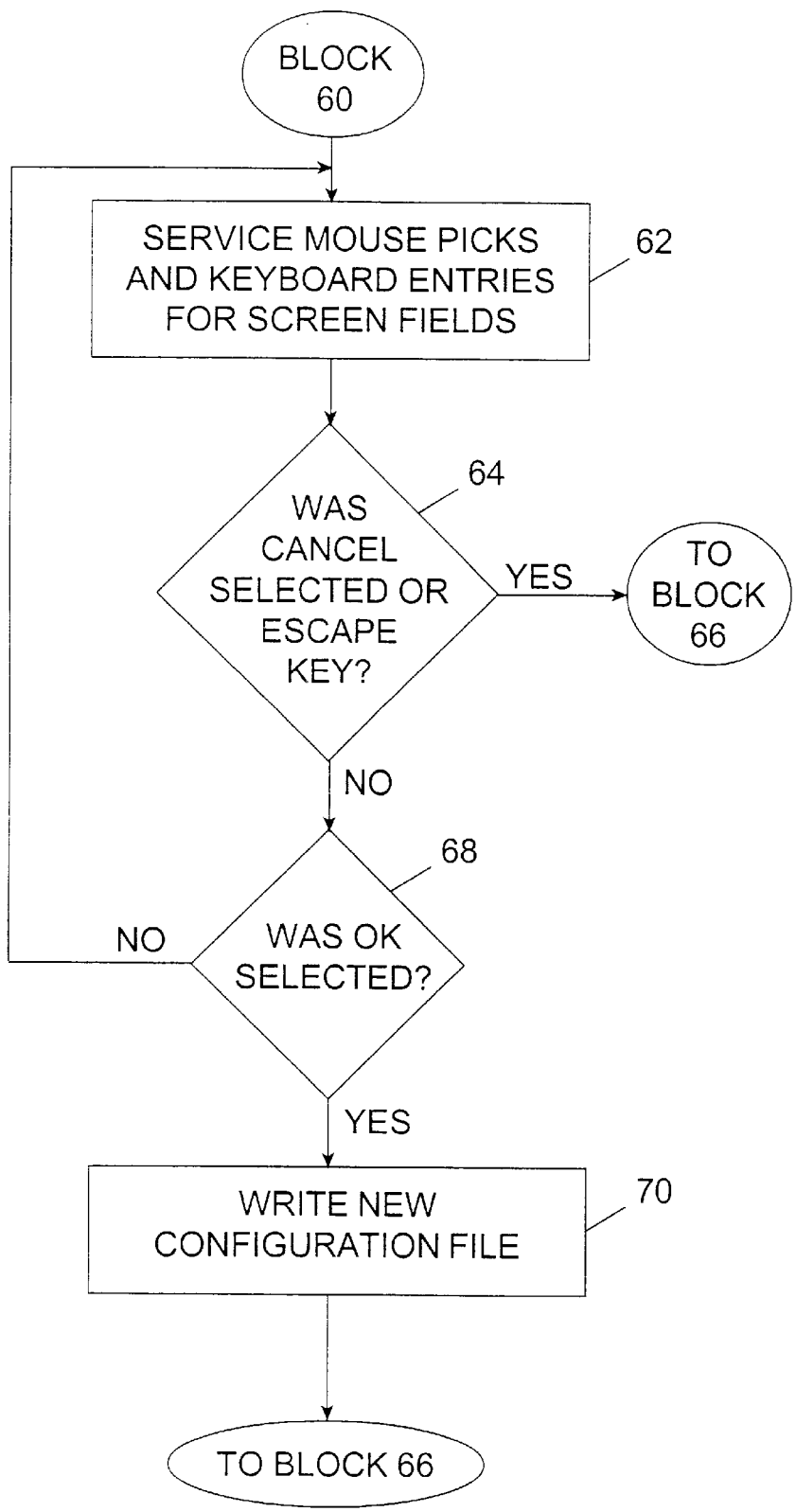
FIG. 3 is a flow chart of the steps performed by the apparatus for modifying a configuration file.

Computer 18 then services mouse picks and keyboard entries for screen fields as illustrated at block 62 in FIG. 3. Computer 18 then determines whether the cancel button was selected or the escape key was pushed at block 64. If so, computer 18 advances to block 66 in FIG. 2. If the cancel button or the escape key was not selected at block 64, computer 18 determines whether the OK button was selected as illustrated at block 68. If the OK button was not selected, computer 18 returns to block 62. If the OK button was selected, the computer 18 writes the new configuration file into the memory of computer 18 as illustrated at block 70. Computer 18 then returns to block 66 of FIG. 2.

Figure 4:
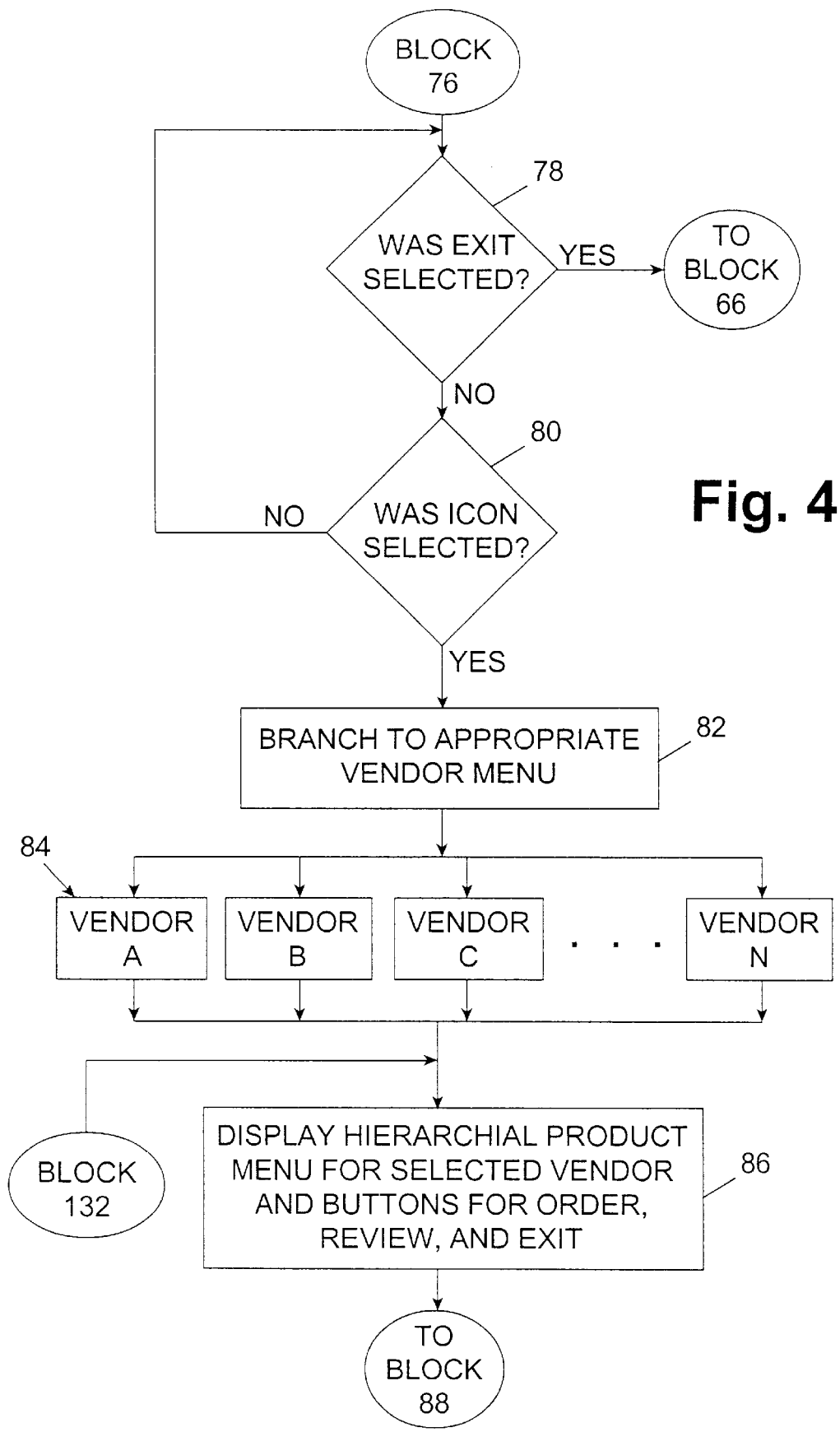
FIG. 4 is a flow chart of the steps performed by the apparatus to select a desired vendor from a menu of available vendors and then to display a hierarchial product menu for the selected vendor.

If the Configure button was not selected at block 58 of FIG. 2, computer 18 determines whether the OK button was selected as illustrated at block 72. If not, the computer 18 returns to block 56. If the OK button was selected at block 72, computer 18 displays a main menu of all available vendors as illustrated at block 74. Computer 18 then advances to block 76 of FIG. 4.

After the vendor list is displayed on monitor 38, computer 18 determines whether an exit button was selected at block 78. If so, computer 18 returns to block 66 of FIG. 2. If the Exit button was not selected, computer 18 determines whether an icon for a particular listed vendor was selected at block 80. If not, computer 18 returns to block 78. If a vendor icon was selected at block 80, computer 18 branches to an appropriate vendor menu as illustrated at block 82.

A plurality of different vendors a through N illustrated by blocks 84 may be provided. In the illustrated example of the jewelry industry, for instance, separate vendors may be accessed for mountings, findings, diamonds, gem stones, finished goods, etc. Once a desired vendor is selected, computer 18 displays a hierarchial product menu for the selected vendor. In addition, computer 18 displays option buttons including "Order," "Review" and "Exit" as illustrated at block 86.

Figure 6:
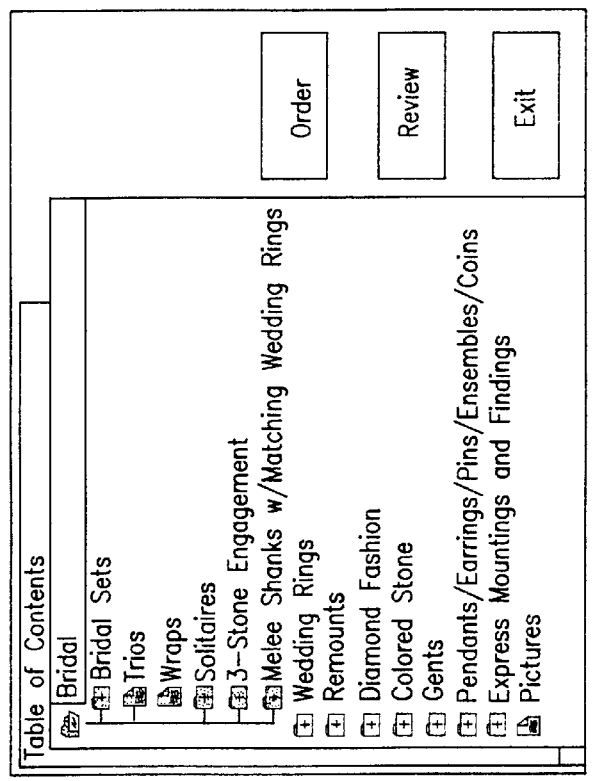
FIG. 6 is a sample screen display illustrating a second level of the product menu.
Figure 5:
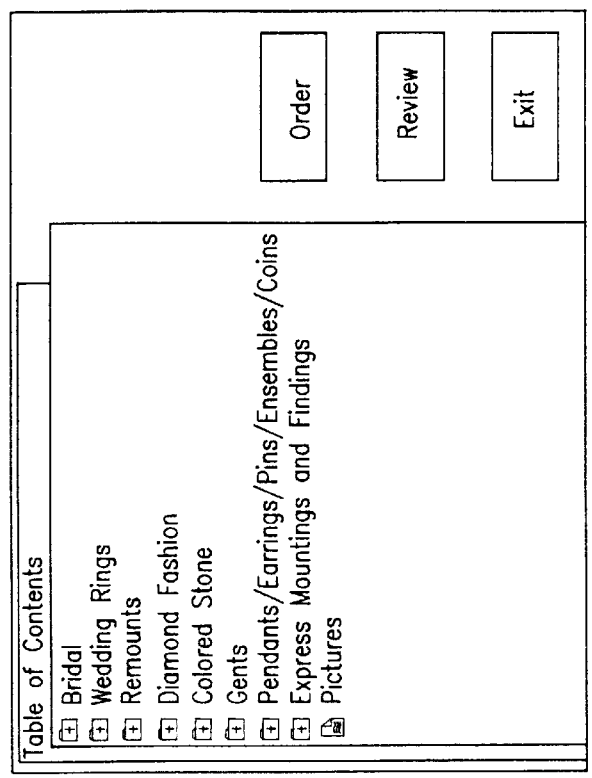
FIG. 5 is a sample screen display of a first level product menu, using jewelry as the illustrated product.
Figure 7:
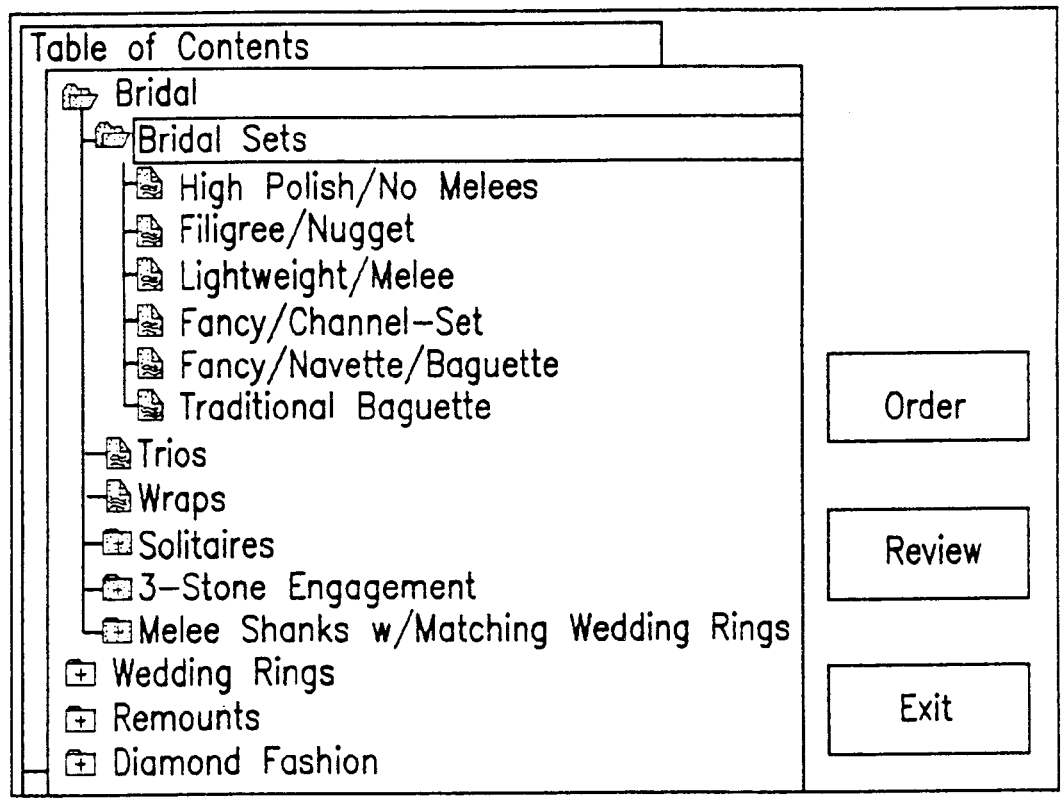
FIG. 7 is a sample screen display illustrating a third level of the product menu.
Figure 8:
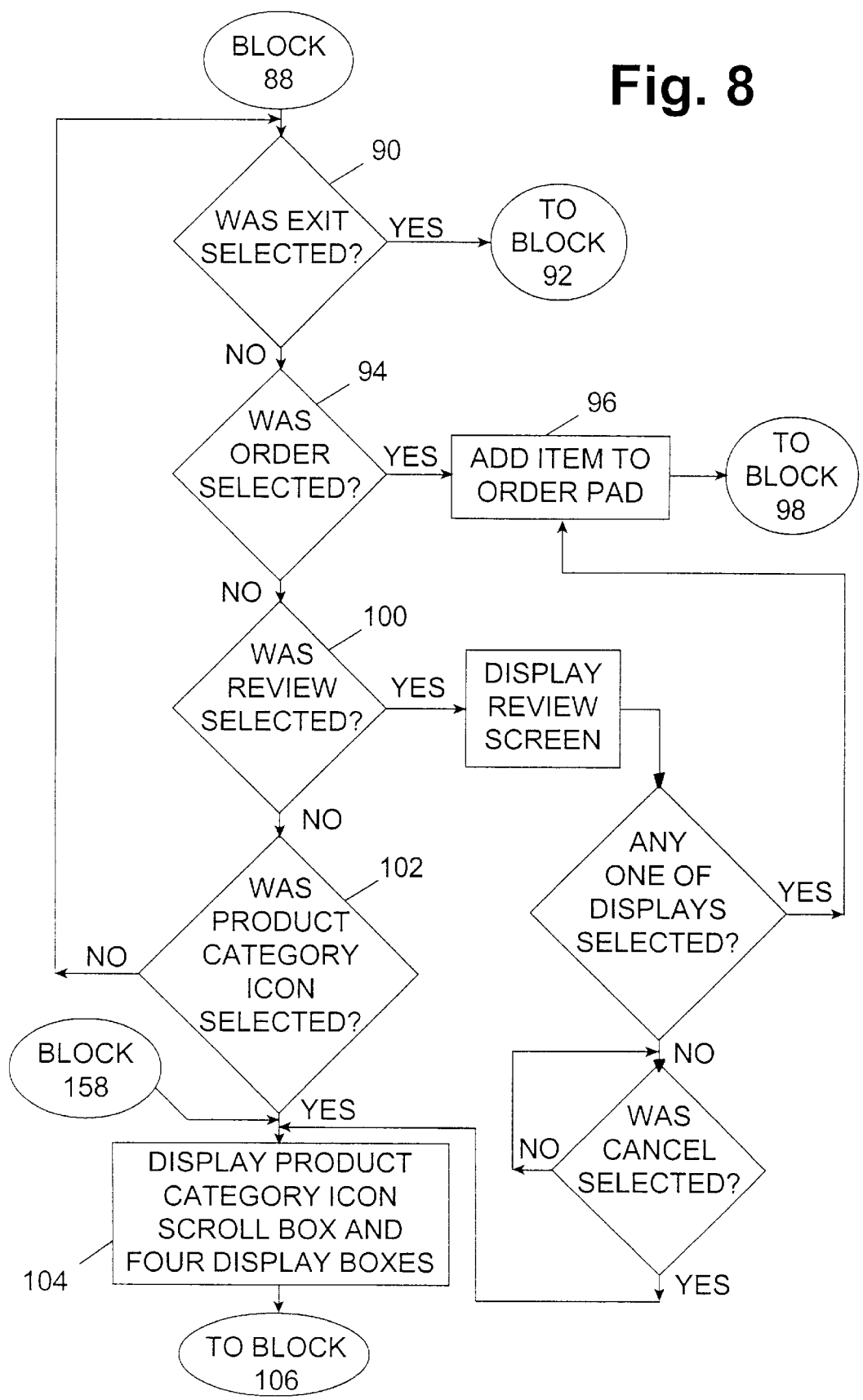
FIG. 8 is a flow chart illustrating the steps performed by the apparatus of the present invention for proceeding through the product menu screens.

Examples of such a hierarchial product menu are illustrated in FIGS. 5–7. FIG. 5 illustrates a first level menu for the illustrative products of jewelry available from a finished goods vendor. From the first level menu displayed by customers computer 18 on monitor 38, the operator can select the desired category of items. Once the category is selected, such as the "Bridal" category of FIG. 5, a second level menu is displayed as illustrated in FIG. 6. From within the second level menu an additional category of items may be selected. For instance "Bridal Sets" may be selected. A third level product menu is then displayed by customer computer 18 as illustrated in FIG. 7. Although the hierarchical menu product menu is not limited to three levels, selection criteria for most products selection criteria can be handled with three levels. Once the final level has been reached, computer 18 proceeds to block 88 of FIG. 8.

Computer 18 determines whether the Exit button was selected at block 90. If so, computer 18 advances to block 82 of FIG. 2. If the Exit button was not selected at block 90, computer 18 determines whether the Order button was selected as illustrated at block 94. If so, computer 18 adds the item to an order pad as illustrated at block 96 and then advances to block 98 of FIG. 15 as discussed in detail below.

If the Order button was not selected at block 94, computer 18 determines whether the Review button was selected at block 100. If the Review button was not selected, computer 18 determines whether a product category icon was selected at block 102. The product category icon can be selected using a computer mouse input device from the third level menu illustrated in FIG. 7. If the product category icon was not selected at block 102, computer 18 advances to block 90. If the product category icon was selected at block 102, computer 18 displays the product category icon scroll box and four separate display boxes for reviewing selected products as illustrated at block 104. Computer 18 then advances to block 106 of FIG. 10.

After the product category is selected, computer 18 can automatically dial up the vendor's server 12 as taught in U.S. application Ser. No. 07/866,867. Vendor's server 12 can then transmit any variable product data to the computer 18 located at the remote sales location along with any updated constant or static data. The variable data may be pricing or available quantities or other textual data, for example. Constant data stored may be product image data and background image data, for example. In addition, as discussed in detail below, the vendor's server 12 can transmit a map for integrating the images of the products with selected background images in order to improve presentation of the products to a customer.

Figure 9:
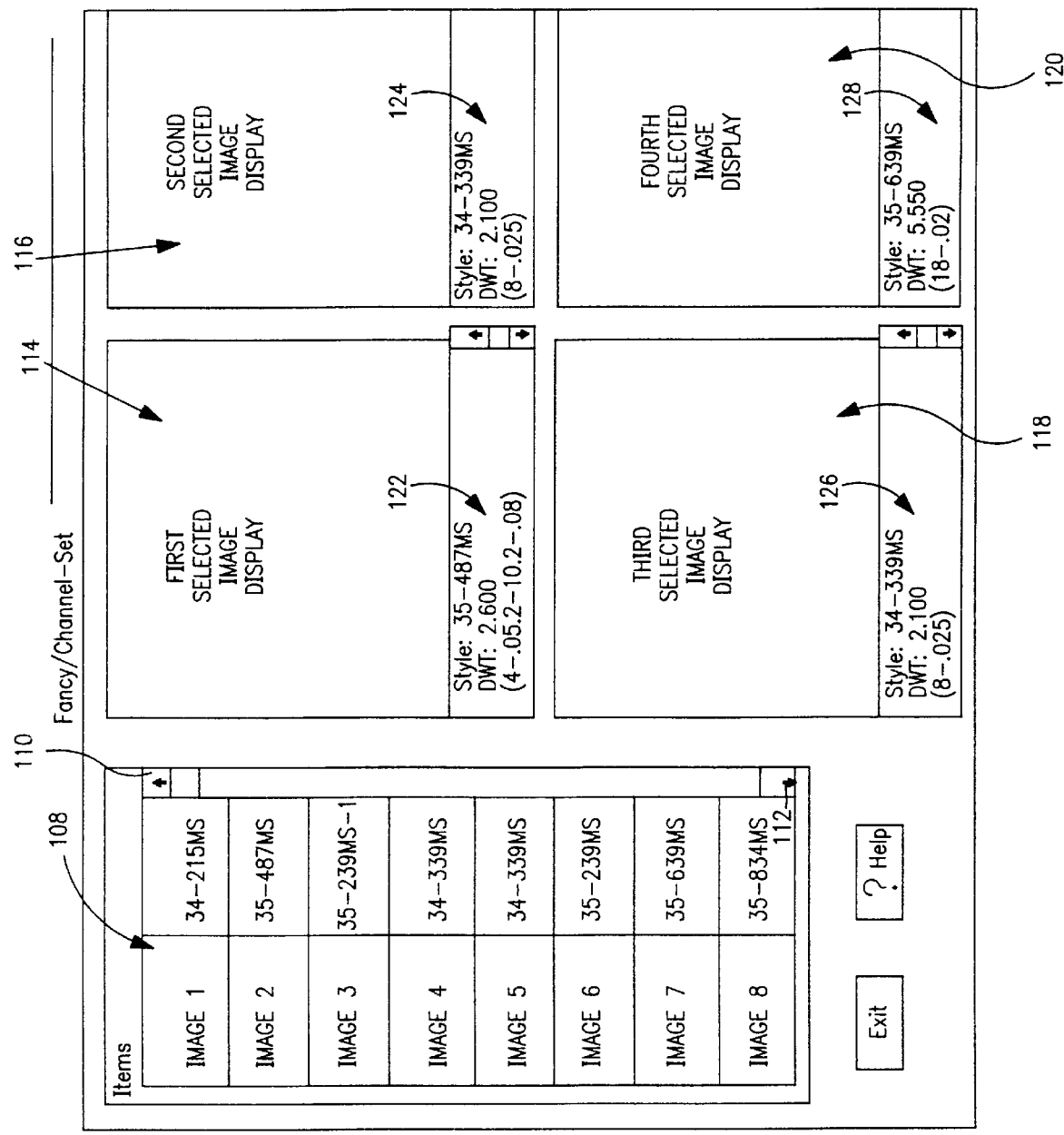
FIG. 9 is a display screen generated on the computer at the sales location which includes an icon scroll box for reviewing images of products available in a selected category and four larger display boxes for displaying product items selected from the scroll box.

FIG. 9 illustrates a screen display on monitor 38 of computer 18 of the product category icon menu scroll box 108 for an illustrative "Fancy Channel-Set" product category selected from the menu of FIG. 7. The product icon menu scroll box 108 displays a plurality of images along with textual data such as the model number for the available items in the selected product category. The operator can scroll through the icon menu scroll box 108 using arrows 110 and 112. The images 1–8 illustrated in FIG. 9 are actual photographic images of the jewelry items available for sale from the vendor. The displayed images may be larger, if desired. As the operator at the sales location scrolls through the product images in scroll box 108 the customer can select items of interest from the scroll box 108. Those selected items are moved to larger display boxes for review as also illustrated in the screen display of FIG. 9. In the illustrated embodiment, four such larger display boxes are provided. The larger images of the selected products are displayed in first, second, third, and fourth selected image display or review boxes 114, 116, 118, and 120, respectively. Below each of the images is an area for textual information related to the selected products at locations 122, 124, 126, and 128, respectively.

Figure 10:
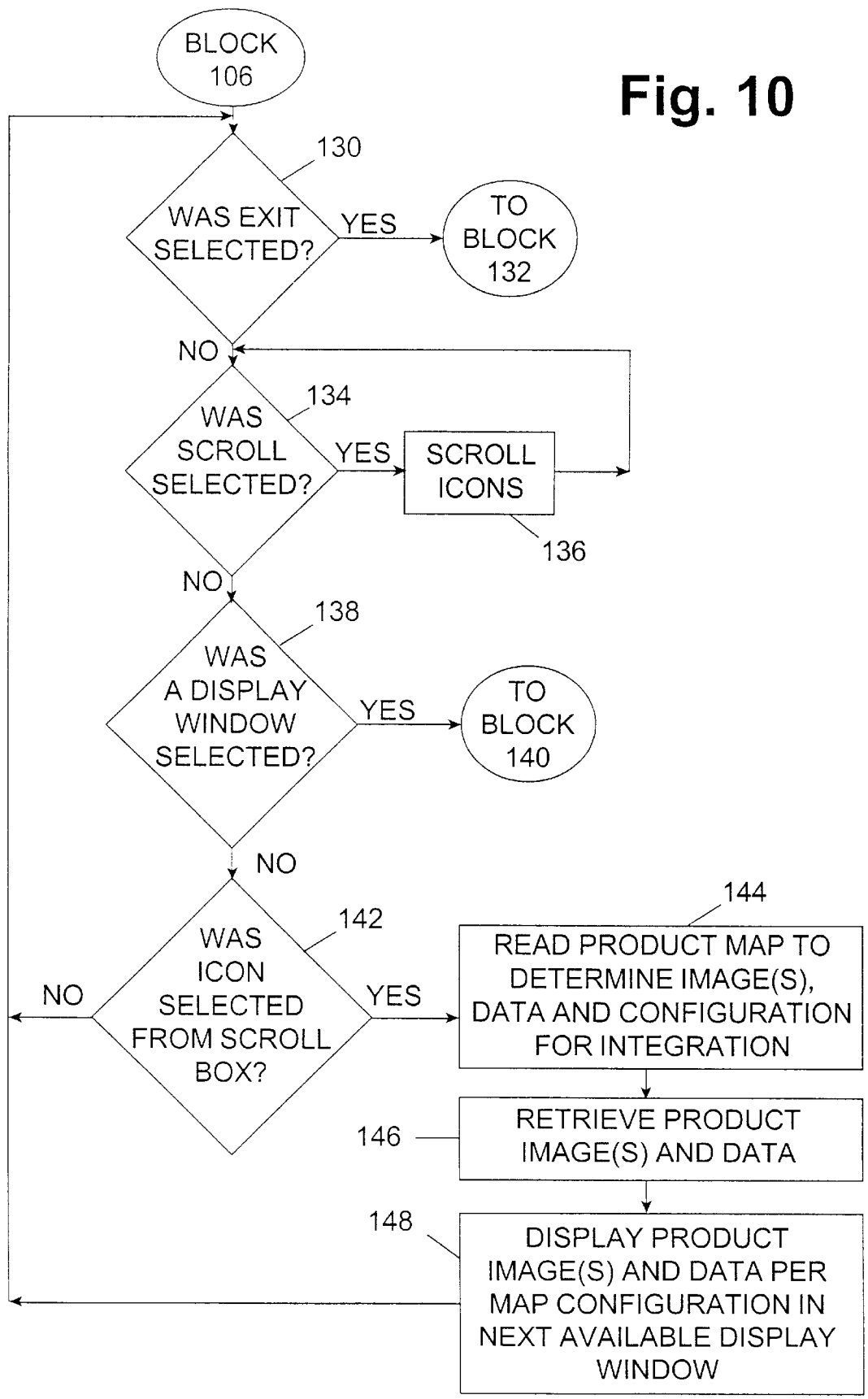
FIG. 10 is a flow chart illustrating the steps performed by the computer to scroll through the items in the selected product category and to display any selected items in the larger review boxes of the display screen.

After FIG. 9 is displayed on monitor 38 of computer 18, computer 18 determines whether the Exit button of FIG. 9 was selected as illustrated at block 130 of FIG. 10. If the Exit button was selected at block 130, computer 18 advances to block 132 of FIG. 4.

If the Exit button was not selected at block 130, computer 18 determines whether the scroll buttons 110 or 112 were selected at block 134. If so, computer 18 scrolls through the icons of product menu scroll box 108 to display the plurality of images and textual data associated with the available product images as illustrated at block 136. Computer 18 then returns to block 134.

If the scroll buttons 110 and 112 were not selected at block 134, computer 18 determines whether a particular display window 114, 116, 118, or 120 was selected as illustrated at block 138. If one of the larger display windows 114, 116, 118, or 120 was selected at block 138, computer 18 advances to block 140 of FIG. 11 as discussed in detail below. If a display window is not selected at block 138, computer 18 determines whether one of the product icons was selected from the scroll box 108 as illustrated at block 142 of FIG. 10. If not, computer 18 returns to block 130.

If one of the product icons was selected from the icon scroll box 108 illustrated in FIG. 9, the image and associated data for the selected product is displayed in the next available display box 114, 116, 118, or 120. A selected background is displayed behind the product image as discussed below. After four such products have been selected, and the product images and data are displayed, the next product selection replaces the first selected image in box 114. This is a continuous loop allowing user to always display four selected products simultaneously. Alternately, the customer may be given our option as to which of the review boxes 114, 116, 118, and 120 are replaced by the newly selected product.

By selecting one of the products in the icon scroll box 108, computer 18 accesses a "map" data base and determines the image or images, the data, and the configuration for the particular image display as illustrated at block 144 of FIG. 10. The data within this "map" record points to the product images, any additional data, and the configuration or background image to use to integrate the images and data. In other words, the product images can be displayed on differently designed backgrounds as discussed in detail below.

Computer 18 retrieves the product images and data from the computer memory as illustrated at block 146. Next, computer 18 displays the product images and data based on the map configuration in the next available display window 114, 116, 118, or 120 as illustrated at block 148 (or a customer selected display window).

At any time, the operator can select one of the four display windows 114, 116, 118, or 120 using the mouse input device. If computer 18 determines that a display window was selected at block 138 of FIG. 10, computer 18 advances to block 140 of FIG. 11. Selection of one of the display windows 114, 116, 118, or 120 causes an order and review box to be displayed as illustrated at block 150 of FIG. 11. A sample screen display of the order and review box is illustrated in FIG. 12. For example, the quantity, type of metal, color, or other parameters related to the products may be displayed as illustrated in section 152. Order and Review buttons are also provided.

Figure 11:
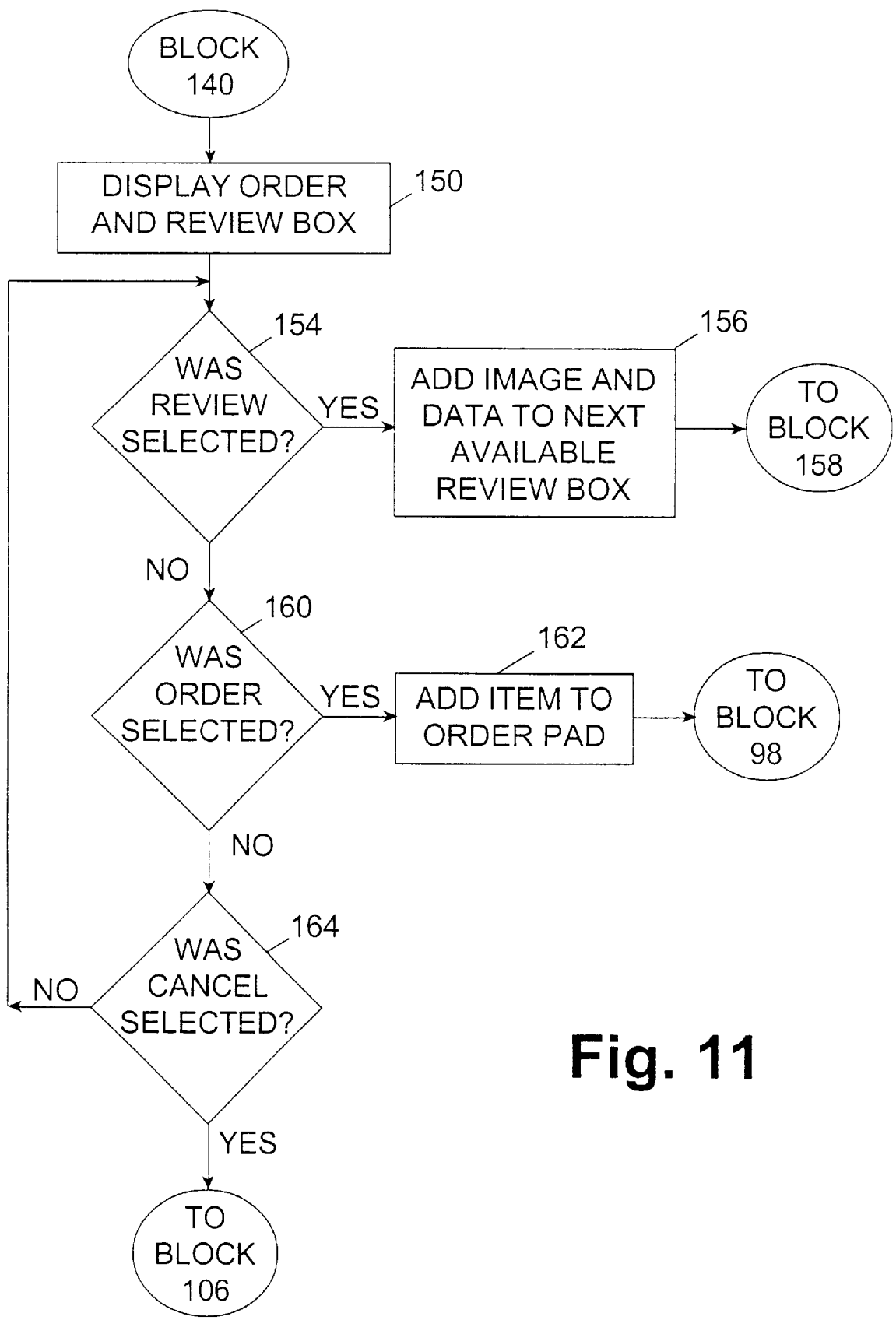
FIG. 11 is a flow chart illustrating the steps performed by the computer if an operator selects one of the display boxes of FIG. 9.
Figure 12:
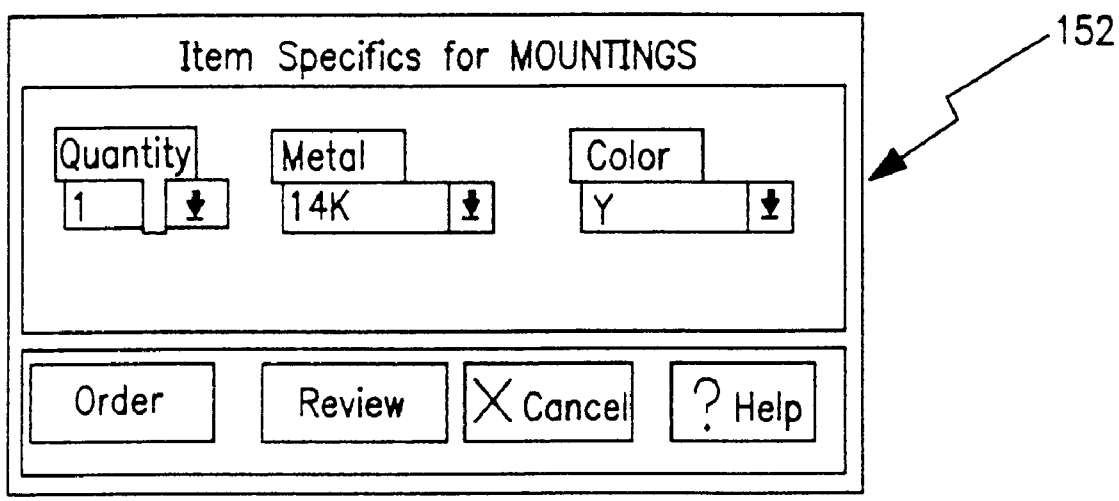
FIG. 12 is a sample screen displayed on the computer to order or review a selected item on the display screen.

Computer 18 determines whether the Review button was selected from the screen of FIG. 12 as illustrated at block 154 of FIG. 11. If the Review button was selected, the product images and data are mapped to the next available display box 178, 180, 182, or 184 of FIG. 13 as illustrated at block 156. Computer 18 then advances to block 158 of FIG. 8.

If the Review button was not selected at block 154, computer 18 determines whether the Order button was selected from the screen of FIG. 12 as illustrated at block 160 in FIG. 11. If the Order button was selected, computer 18 adds the item to the order pad as illustrated at block 162 and then advances to block 98 of FIG. 15 as discussed below.

If the Order button was not selected at block 160, computer 18 determines whether the Cancel button was selected as illustrated at block 164. If not, computer 18 returns to block 154. If the Cancel button was selected at block 164, computer 18 advances to block 106 of FIG. 10.

Figure 13:
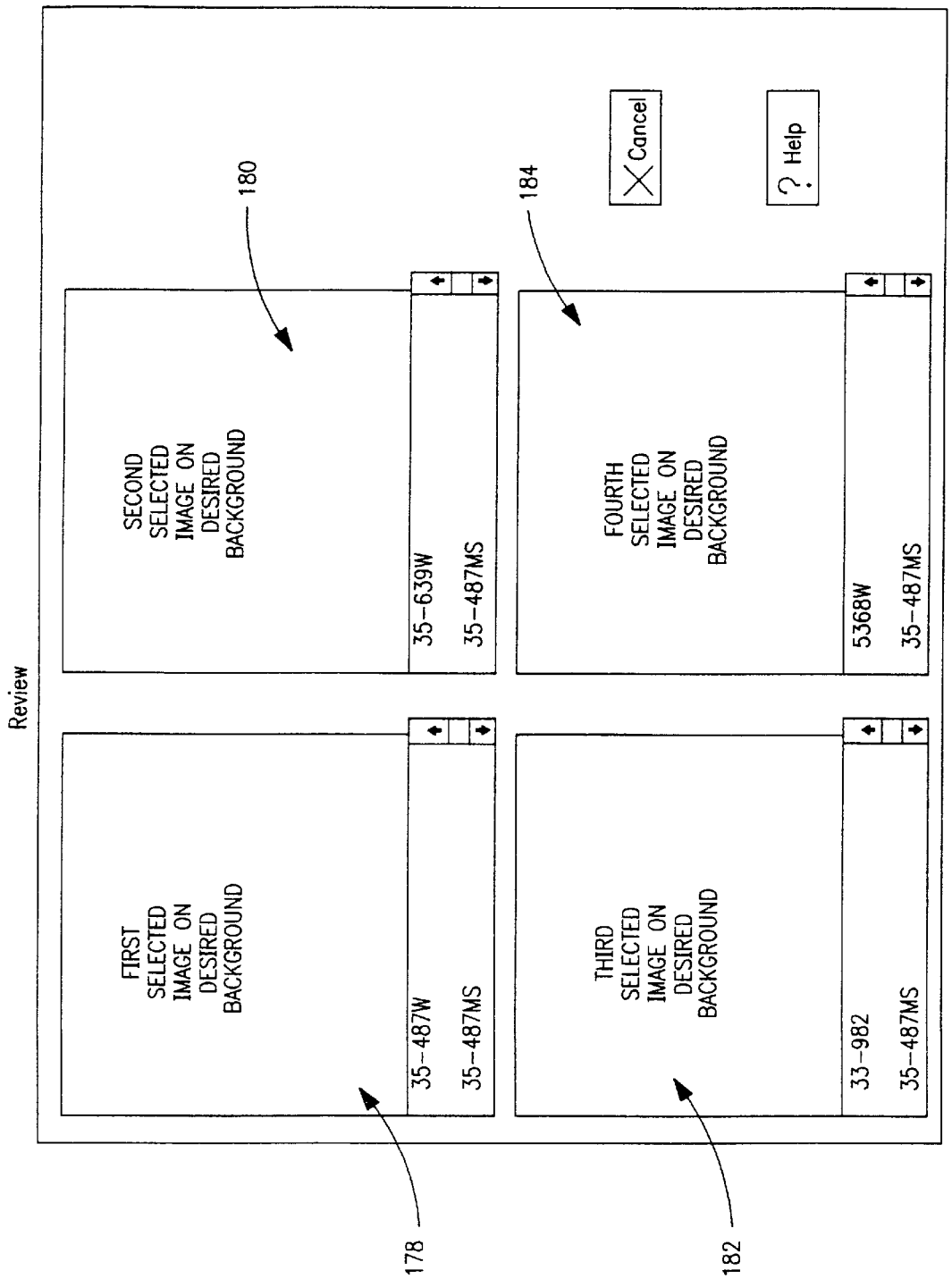
FIG. 13 is a screen displayed on the computer for reviewing selected images and data related to products selected and moved to the review boxes.

Anytime the review button is selected, computer 18 displays the four selected image display boxes 178, 180, 182, and 184 as illustrated in FIG. 13. This permits a side-by-side comparison of the particular products in which the customer is interested.

Figure 15:
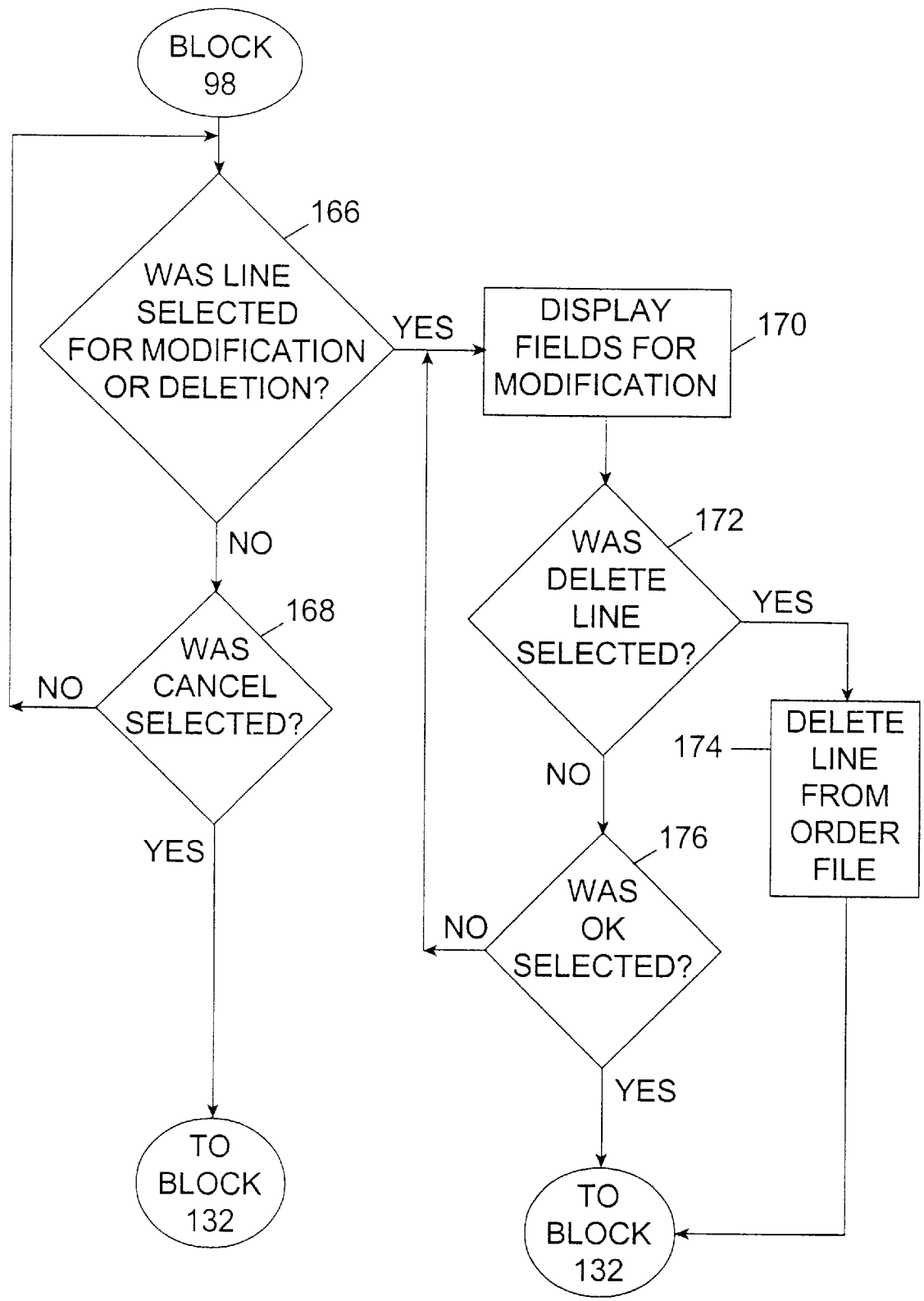
FIG. 15 is a flow chart illustrating the steps performed by the computer during the ordering process.

Referring now to FIGS. 14 and 15, FIG. 14 is a sample order pad display screen which computer 18 displays on monitor 38. The order pad lists quantity and style number for the various products which are to be ordered. Steps performed by the computer 18 are illustrated in FIG. 15. Computer 18 determines whether a line on the order pad on FIG. 14 was selected for modification or deletion as illustrated at block 166 of FIG. 15. If not, computer 18 determines whether the Cancel button was selected at block 168. If the Cancel button was not selected, computer 18 returns to block 166. If the Cancel button was selected at block 168, computer 18 advances to block 132 of FIG. 4.

If a line on the order pad was selected for modification or deletion at block 166, computer 18 displays fields for modification as illustrated at block 170. Computer 18 determines whether a delete line entry was selected at block 172. If so, computer 18 deletes the selected line from the order file as illustrated at block 174 and then returns to block 132 of FIG. 4. If a delete line was not selected at block 172, computer 18 determines whether an OK button was selected as illustrated at block 176. If not, computer 18 returns to block 170. If the OK was selected at block 176, computer 18 advances to block 132 of FIG. 4.

After particular items are selected for ordering, computer 18 can automatically transmit the order to the vendor's computer 12 through modem 20 as discussed above. In addition, computer can print out an order form on printer 24. The printed order form is then sent to the vendor.

The mapping feature of the present invention provides computer 18 with the ability to overlay an image on a desired background. In the present invention, a transparent solid background is provided for the stored image file related to a product item which is then overlaid on the desired background. In accordance with the present invention, a cyan background is used as the transparent color. The product images are photographed against a flat black background. The images of the products can be on film and converted to digital format by scanning or directly to a digital format using a digital camera. Once in a digital format, the images are electronically scanned. All the black pixels in the image are changed to cyan and stored. When the image is placed on top of a selected background image, the background shows through in any locations where there is a cyan pixel. The image of the product which is made up of pixels having colors other than cyan, is visible in the foreground of the image.

In merchandising, special days are used to help generate interest in products. For instance, Father's Day, Mother's Day, Valentine's Day, Thanksgiving, Christmas, etc. are all used for special product promotions. When advertising products for these special days, the merchandiser typically generates advertisements having themes associated with the particular event. The present invention provides the capability of dynamically applying a background to the image of a product to create an electronic virtual product catalog. Therefore, the background can be changed and dynamically applied to the product images, such as pieces of jewelry, that the retailer wishes to offer as a particular special. The mapping feature in which the product image data is mapped to a particular background scene can be accomplished entirely on the computer 18. In addition, the data related to the image data and background data can be updated and mapped from a vendors computer 12 using the techniques disclosed in U.S. application Ser. No. 07/866,867, which is incorporated herein by reference. Using the concept of a "map" to define the exact way a product image, product information, and a background image are integrated, a desired product presentation image can be generated. In addition, all components of the presentation image can be managed and maintained by a central server such as vendor's computer 12. This allows the vendor's corporate marketing and advertising department to control and manage product presentation at each of its different sales locations efficiently.

Although the invention has been described in detail with reference to a certain preferred embodiment, variations and modifications exist within the scope and spirit of the present invention as described and defined in the following claims.

What is claimed is:

1. A method for presenting a plurality of product images for review by a user on a computer including a display, a memory, and an input device, the product images including a selected background image, the method comprising the steps of:

displaying a menu including a plurality of available vendors on the display;

receiving a user input selecting one of the vendors;

displaying a product category menu on the display for products available from a selected vendor;

receiving a user input selecting one of the product categories from the product category menu;

displaying a plurality of product images on the display from the selected product category;

providing at least two product image review boxes on the display for a side-by-side comparison of selected product images;

receiving a user input selecting a product image from the plurality of product images displayed on the display;

integrating the selected product image with a selected background image to provide a customized product image; and displaying the customized product image in one of the review boxes for a side-by-side comparison with at least one other selected product image.

2. The method of claim 1, further comprising the steps of receiving a user input to order a selected product displayed on the display, and automatically generating an order form for the selected product.

3. The method of claim 2, further comprising the step of automatically transmitting the order form from the computer to a vendor's computer located at a remote location.

4. The method of claim 1, wherein the step of displaying a plurality of product images includes the step of displaying a scroll box on the display which includes a plurality of product images from the selected product category.

5. The method of claim 1, wherein the product image and the selected background image are integrated based on a map transmitted to the computer from a vendor's computer located at a remote location.

6. The method of claim 1, wherein the product category menu is a hierarchical product category menu including at least two levels.

7. The method of claim 6, wherein the hierarchical product category menu includes three levels.

8. The method of claim 1, further comprising the step of establishing a communication link between the computer and a vendor's computer located at a remote location after the desired product category is selected, the vendor's computer transmitting variable data and updated constant data related to the plurality of products from the selected product category to the computer.

9. A method for presenting a plurality of product images for review by a user on a computer including a display, a memory, and an input device, the product images including a selected background image, the method comprising the steps of:

displaying a plurality of product images on the display;

providing product image review boxes on the display for a side-by-side comparison of selected product images;

receiving a user input selecting a product image from the plurality of product images displayed on the display;

integrating the selected product image with a selected background image to provide a customized product image; and displaying the customized product image in one of the review boxes for a side-by-side comparison with at least one other selected product image.

10. The method of claim 9, wherein the step of displaying a plurality of product images includes the step of displaying a scroll box on the display which includes the plurality of product images from the selected product category.

11. The method of claim 10, wherein the product images in the review boxes are larger than the product images in the scroll box.

12. The method of claim 9, wherein selected product images are displayed in the next available review box until all the review boxes are filled with product images, and wherein the next selected product image replaces the product image in one of the review boxes.

13. The method of claim 12, wherein the user selects the review box in which to replace the product image after all the review boxes are filled with product images.

14. The method of claim 9, further comprising the steps of receiving a user input to order a selected product displayed on the display, and automatically generating an order form for the selected product.

15. The method of claim 14, further comprising the step of automatically transmitting the order form for the selected product from the computer to a vendor's computer located at a remote location.

16. The method of claim 9, wherein the product image and the selected background image are integrated based on a map transmitted to the computer from a vendor's computer located at a remote location.

17. A method for displaying a product image for review by a user on a computer including a display, a memory, and an input device, the method comprising the steps of:

storing a plurality of product images in the memory of the computer;

storing a plurality of background images in the memory of the computer;

selecting one of the background images to be displayed on the display with each product image;

receiving a user input to display a selected product image; and integrating the selected product image with the selected background image on the display to provide a customized product image on the display.

18. The method of claim 17, wherein the product image and the selected background image are integrated based on a map transmitted to the computer from a vendor's computer located at a remote location.

19. The method of claim 17, wherein the step of storing a plurality of product images in the memory of the computer includes the steps of photographing the products against a black background, converting the photographic product image into a digital product image data format, changing any black pixels in the digital product image data to cyan pixels, and storing the modified product image data in the computer memory.

20. The method of claim 19, wherein the integrating step includes the step of overlaying the modified product image data over a selected background image on the display so that the cyan pixels in the modified product image data permit the background image to be displayed on the display.

21. An apparatus for presenting a plurality of product images including a selected background image for review by a user, the apparatus comprising:

a computer including a display, a memory, and an input device;

means for displaying a menu including a plurality of available vendors on the display;

means for receiving a user input selecting one of the vendors;

means for displaying a product category menu on the display for products available from a selected vendor;

means for receiving a user input selecting one of the product categories from the product category menu;

means for displaying a plurality of product images on the display from the selected product category;

means for providing at least two product image review boxes on the display for a side-by-side comparison of selected product images;

means for receiving a user input selecting a product image from the plurality of product images displayed on the display;

means for integrating the selected product image with a selected background image to provide a customized product image; and means for displaying the customized product image in one of the display boxes for a side-by-side comparison with at least one other selected product image.

22. The apparatus of claim 21, further comprising means for receiving a user input to order a selected product displayed on the display, and means for generating an order form for the selected product.

23. The apparatus of claim 22, further comprising means for transmitting the order form from the computer to a vendor's computer located at a remote location.

24. The apparatus of claim 21, wherein the means for displaying a plurality of product images includes means for displaying a scroll box on the display which includes a plurality of product images from the selected product category.

25. The apparatus of claim 21, wherein the product image and the selected background image are integrated by the integrating means based on a map transmitted to the computer from a vendor's computer located at a remote location.

26. The apparatus of claim 21, wherein the product category menu is a hierarchical product category menu including at least two levels.

27. The apparatus of claim 26, wherein the hierarchical product category menu includes three levels.

28. The apparatus of claim 21, further comprising means for establishing a communication link between the computer and a vendor's computer located at a remote location after the desired product category is selected, the vendor's computer transmitting variable data and updated constant data related to the plurality of products from the selected product category to the computer.

29. An apparatus for presenting a plurality of product images including a selected background image for review by a user, the apparatus comprising:

a computer including a display, a memory, and an input device;

means for displaying a plurality of product images on the display;

means for providing product image review boxes on the display for a side-by-side comparison of selected product images;

means for receiving a user input selecting a product image from the plurality of product images displayed on the display;

means for integrating the selected product image with a selected background image to provide a customized product image; and means for displaying the customized product image in one of the review boxes for a side-by-side comparison with at least one other selected product image.

30. The apparatus of claim 29, wherein the means for displaying a plurality of product images includes means for displaying a scroll box on the display which includes the plurality of product images from the selected product category.

31. The apparatus of claim 30, wherein the product images in the review boxes are larger than the product images in the scroll box.

32. The apparatus of claim 29, wherein selected product images are displayed in the next available review box until all the review boxes are filled with product images, and wherein the next selected product image replaces the product image in one of the review boxes.

33. The apparatus of claim 32, wherein the user selects the review box in which to replace the product image after all the review boxes are filled with product images.

34. The apparatus of claim 29, further comprising means for receiving a user input to order a selected product displayed on the display, and means for generating an order form for the selected product.

35. The apparatus of claim 34, further comprising means for transmitting the order form for the selected product from the computer to a vendor's computer located at a remote location.

36. The apparatus of claim 29, wherein the product image and the selected background image are integrated by the integrating means based on a map transmitted to the computer from a vendor's computer located at a remote location.

37. An apparatus for displaying a product image for review by a user, the apparatus comprising:

a computer including a display, a memory, and an input device;

means for storing a plurality of product images in the memory of the computer;

means for storing a plurality of background images in the memory of the computer;

means for selecting one of the background images to be displayed on the display with each product image;

means for receiving a user input to display a selected product image; and means for integrating the selected product image with the selected background image on the display to provide a customized product image on the display.

38. The apparatus of claim 37, wherein the product image and the selected background image are integrated by the integrating means based on a map transmitted to the computer from a vendor's computer located at a remote location.

39. The apparatus of claim 38, wherein the integrating means includes means for overlaying the product image over a selected background image on the display.

* * * * *